March 1, 1927.
V. LINK
BRAKE
Original Filed Sept. 22, 1923    2 Sheets-Sheet 1
1,619,579
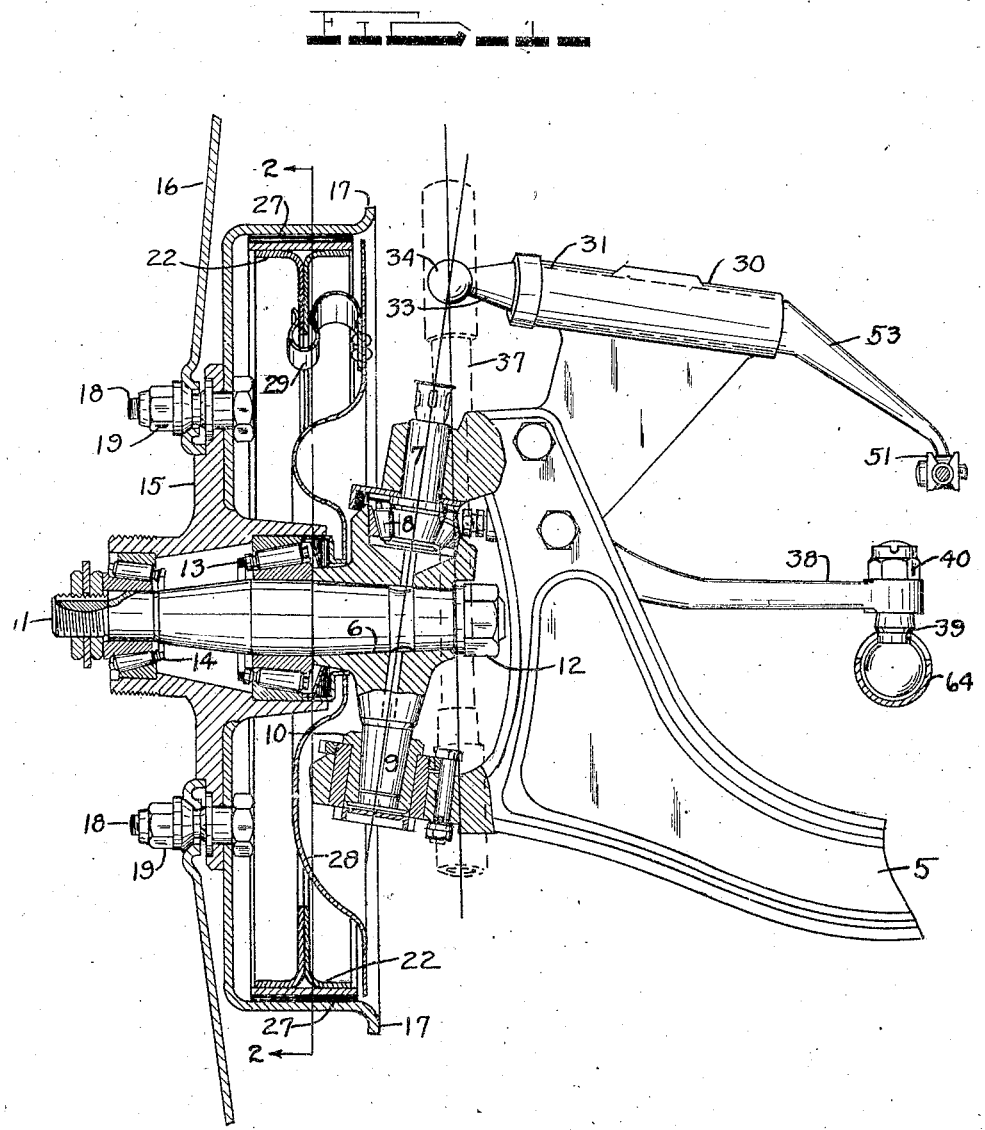
INVENTOR
VINCENT LINK.
BY
P. M. Pomeroy
ATTORNEY March 1, 1927. 1,619,579
V. LINK
BRAKE
Original Filed Sept. 28, 1923 2 Sheets-Sheet 2
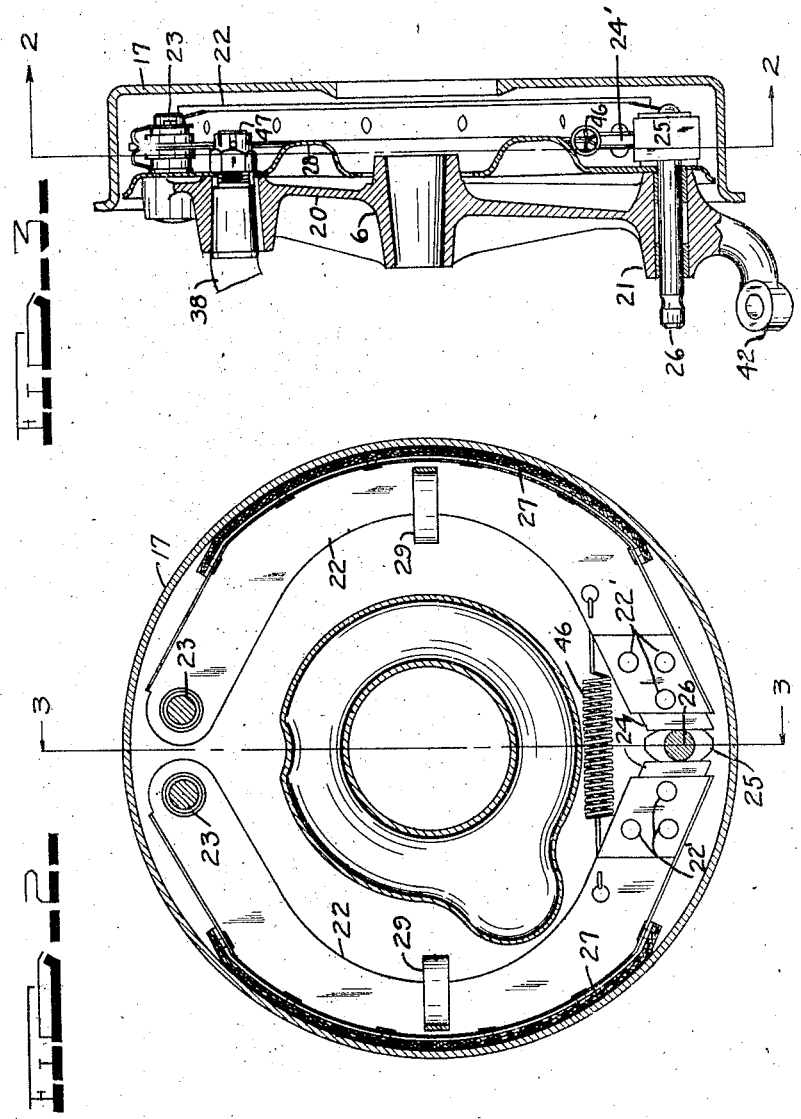
INVENTOR
VINCENT LINK.
BY
ATTORNEY Patented Mar. 1, 1927.

1,619,579

UNITED STATES PATENT OFFICE.

VINCENT LINK, OF DETROIT, MICHIGAN, ASSIGNOR TO THE STUDEBAKER CORPORATION, OF SOUTH BEND, INDIANA, A CORPORATION OF NEW JERSEY.

BRAKE.

Original application filed September 28, 1923, Serial No. 665,442. Divided and this application filed April 22, 1926. Serial No. 103,875.

This application is a division of my application for improvements in brakes, filed September 28, 1923, and serially numbered 665,442.

This invention relates to brakes, and more particularly to brakes shoes therefor, the principal object being to provide new and improved means for supporting the hardened cam contact face member thereon.

Another object is to provide a brake shoe having spaced parallel flanges at its end, and a cam contact face member extending between the flanges and having oppositely extending thrust shoulders engaging the ends of the flanges.

Another object is to provide a pressed metal brake shoe having a two part radial rib, the parts being spread at one end of said shoe to provide a recess, and a thrust member extending into the recess and having shoulders engaging the end of the shoe.

A further object is to provide a brake shoe provided with a recessed end, and a cam contact face member abutting against said end and provided with a shank received in said recess.

The above being among the objects of the present invention, the same consists of certain features of construction and combination of parts to be hereinafter described with reference to the accompanying drawings, and then claimed; having the above and other objects in view.

In the accompanying drawings, in which like numerals refer to like parts throughout the several different views, Figure 1 is a vertical sectional view taken transversely through the center of a motor vehicle front wheel brake mechanism incorporating a suitable embodiment of the present invention, together with parts ancillary thereto.

Figure 2 is a sectional view taken in the plane of the lines 2—2 of Figures 1 and 3, showing only the brake drum, brake drum cover, cam and the brake shoes; the parts being shown turned about the axis of the brake drum a slight amount from the position shown in Figure 1.

Figure 3 is a sectional view taken on the line 3—3 of Figure 2.

Referring to the numbered parts of the drawings, in which like numerals refer to similar parts, 5 is an axle formed with a yoke at either end in which the wheels are supported, and as the parts are of similar construction I have shown and will describe only the left wheel. A steering knuckle 6 is supported in the yoke by a conventional construction consisting of the pin 7 supported in the bearing 8 at the upper end of the steering knuckle 6 and by the reduced lower end 9 of the knuckle bearing in the bushing 10 which is suitably supported in the lower arm of the yoke. A wheel spindle 11 which has a tapered inner end fits into the knuckle 6 and is held therein against movement by the nut 12. The outer end of the spindle 11 is provided with bearings 13 and 14 which support the hub 15 of the wheel 16. Although I have shown a disc wheel in the drawings it is to be understood that my invention may equally well be adapted to any of the several types of wheels adapted for motor vehicles and I do not limit myself to any particular type. A conventional type of brake drum 17 is secured to the wheel 16 by the bolts 18 and nuts 19 which also serve to secure the wheel 16 to the hub 15.

The steering knuckle 6 is provided with extending arms or wings 20 and 21 which are adapted for supporting the two brake shoes 22 and the cam for separating the same, the brake shoes being pivotally supported on the pins 23 secured to the wing 20. Flat faced brackets 24 are secured to the free ends of the brake shoes 22 and are held in engagement against the cam 25 by the coil spring 46 whose outer ends are connected to the respective brake shoes (see Figure 2). As shown in Figure 3, the flanged portions of the shoes 22 are offset adjacent their free ends to provide recesses to receive the projecting flange on the flat-faced brackets 24. Each bracket 24 has a flange portion 24' having holes therein matching with drilled or punched holes in the brake shoe 22 adapted to receive the rivets 22'. The flat face of the bracket 24 extends at substantially right angles to the flange portion 24' on either side thereof and is adapted to engage the ends of the shoe 22 as shown in Fig. 2, to provide thrust shoulders engaging the same. A cam 25 is formed on a short shaft 26 which is supported in a bearing in the wing 21 of the steering knuckle 6, and the brake shoes 22 are provided with a friction facing 27 so positioned that the facing 27 is normally out of contact with the drum 17. When the operator desires to apply braking force to the brake drum, the shaft 26 and therefore the cam 25 is rotated which causes the brake shoe bracket 24 to separate, thereby forcing the friction facing 27 of the brake shoe 22 into contact with the brake drum 17. A dust cover 28 is secured to the steering knuckle 6 and covers the open end of the brake drum 17, keeping the dust and dirt out of the interior thereof, and also serves to support the S shaped spring members 29 which have resilient engagement with the central web of the brake shoes, as shown in Figure 1, to keep the same in a central position and to prevent rattling thereof.

A bracket 30 is bolted to the axle 5 and supports and forms a bearing for the shaft 31 which has a lever 53 formed integral therewith at one end, and another lever 33 secured at its other end. The lever 33 has a ball 34 formed on its free end and is so formed and positioned that the ball 34 falls substantially in the pivot line of the steering knuckle 6, which is the line running through the axis of the pin 7 and end 9. This position is such that the ball 34 is substantially in the same relative position in regard to the steering knuckle 6 and the axle 5, regardless of the angular position of the steering knuckle 6 in respect to the axle 5. As the lever 33 is moved about the axis of the shaft 31, and the position of the ball 34 is slightly changed in respect to the pivotal axis of the steering knuckle 6 due to the arc through which it is constrained to travel, it therefore is not absolutely in line with the said pivotal axis at all times. This small movement causes a change in its position relative to the steering knuckle when the angular position of the latter is changed, but inasmuch as the lever 33 has a limited amount of movement about the center line of the shaft 31 and is adjusted and designed to keep the ball 34 substantially in line with the pivotal axis of the steering knuckle 6, to all practical purposes the relative position of the ball 34 with respect to the steering knuckle 6 and axle 5 remains the same regardless of the angular position of the steering wheels 16 in relation to the body of the vehicle.

A lever (not shown) secured to the end of the shaft 26 opposite the cam 25 terminates in a ball (not shown) and a drag-link 37 provided with socket ends connects the ball 34 with the same so that movement of one causes an equal movement of the other. It is now apparent that movement of the lever 53 causes the shaft 31 to turn which moves the lever 33, drag-link 37 and the lever described which is secured to the shaft 26, and turns the shaft 26 and cam 25 to expand the brake shoes 22 against the brake drum 17, thus exerting a braking effect on the wheel 16. Inasmuch as the ball 34 remains substantially in the line of pivot of the steering knuckle as has been explained, the angular position of the wheel 16 with respect to the body of the vehicle in no way affects the relative position of the brake mechanism or the operation of applying the brakes.

A rod 51 is pivotally connected to the free end of the lever 53 and extends rearwardly to a lever (not shown in the drawings but shown and lettered as 49 in my co-pending application filed June 8, 1923, Serial No. 644,078) which is suitably supported on the frame (shown and lettered as 5 in my co-pending application) of the vehicle at a point in the neighborhood of the front spring rear hanger (shown in my co-pending application) which is substantially at the pivotal center of the arc through which the front axle travels due to the movement of the spring between the axle and vehicle frame. The rod 51 is thus pivoted on the frame at such a point that the spring movement between the axle and frame does not cause any substantial movement of the free end of the lever 53 relative to the axle 5, and therefore does not cause any movement of the braking mechanism on the axle 5 and steering knuckle 6.

An arm 38 is secured to the wing 20 by the nut 47 (Figure 3) and a ball member 39 is secured to its outer end by the nut 40. A reach-rod 64 terminating in a socket for receiving the ball of the member 39 connects the same to a suitable steering gear (not shown) for controlling the direction of movement of the vehicle.

The lower end of the wing 21 is extended and terminates in an eye 42 which receives a ball member (not shown). A reach rod (not shown) connects this ball member with a similar one on the opposite steering wheel in order that both steering wheels will function together in proper manner.

This construction is particularly desirable in that it does not require intricate multiple parts for the cam construction as is necessary when the cam operating shaft is supported on the axle, the cam and shaft in the present construction being of the conventional design usually associated with the ordinary type of internal expanding brake used on the rear wheels. Where a multiple part cam is used and the cam operating shaft is supported on the axle, there necessarily is a sliding movement between cam and brake shoe ends when the wheel is turned in the operation of steering, and careful attention must be paid to the lubrication of the cam, because if some of its parts should become dry and work hard or become stuck serious effects might result in applying the brakes, especially in turning corners.

The present construction is also particularly desirable in that there is practically no movement of the parts when not in operation, which has heretofore been present due to the spring movement of the vehicle, the only movement in the present case being a slight turning of the rod connecting the free end of the lever 32 and the lever on the frame mentioned above in the reference to my co-pending application. Inasmuch as the rod 51 is comparatively long in relation to the spring movement, its angular movement is so small that it is almost negligible, and the wear due to this movement is therefore also negligible. For this reason this construction is much more desirable to use than those constructions in which the cam and cam operating shaft is supported on the steering knuckle and a universal and slip joint connect the operating shaft to a lever on the vehicle frame above the axle, which construction necessarily has a continuous movement of the slip joint due to the spring movement of the vehicle, and consequently is subjected to considerable wear.

Formal changes may be made in the specific embodiment of the invention described without departing from the spirit or substance of the broad invention, the scope of which is commensurate with the appended claims.

What I claim is:

1. A brake shoe having spaced parallel flanges at its end, and a separate part extending between the flanges and having oppositely extending thrust shoulders engaging the ends of the flanges.

2. A pressed metal shoe having a recess at one end and a thrust member extending into the recess and having thrust shoulders engaging the end of the shoe.

3. A movable braking member for vehicle wheels comprising a member having spaced parallel flanges at its end, and a cam contact member having a projection extending between said flanges and secured thereto, the inner face of said cam contact member engaging the ends of said flanges.

4. A pressed metal brake shoe having a recess at one end and a cam contact member having a projection extending into and secured in said recess, the inner face of said cam contact member engaging the end of said shoe.

5. A brake shoe comprising two sections, the sections having webs extending radially of the shoe, and a hardened wear plate having a flat face secured at the end of the shoe and transmitting brake applying thrust directly to the ends of the webs.

6. A brake shoe comprising two separate sections secured together, and a wear plate having a flat face directly engaging the ends of both sections to transmit thrust thereto.

Signed by me at Detroit, Michigan, U. S. A., this 15th day of April, 1926.

VINCENT LINK.